United States Patent
Schuster

[15] 3,638,105
[45] Jan. 25, 1972

[54] METHODS AND APPARATUS FOR INVESTIGATING THE SPONTANEOUS POTENTIAL OF EARTH FORMATIONS

[72] Inventor: Nick A. Schuster, Darien, Conn.
[73] Assignee: Schlumberger Technology Corporation, New York, N.Y.
[22] Filed: Dec. 3, 1969
[21] Appl. No.: 881,793

[52] U.S. Cl....................................................324/1, 324/10
[51] Int. Cl. .........................................................G01v 3/18
[58] Field of Search.................................................324/1, 10

[56]       References Cited

UNITED STATES PATENTS

| 2,728,047 | 12/1955 | Doll | 324/1 |
| 3,268,801 | 8/1966 | Clements et al. | 324/10 |
| 3,373,349 | 3/1968 | Tanguy | 324/10 |

*Primary Examiner*—Gerard R. Strecker
*Attorney*—William J. Beard, Leonard R. Fellen, Donald H. Fidler, Stewart F. Moore, Jerry M. Presson, Edward M. Roney, William R. Sherman and John P. Sinnott

[57]         ABSTRACT

In accordance with illustrative embodiments of the present invention, a technique is disclosed for substantially eliminating noise from measurements of the spontaneous potential made in a borehole drilled into the earth. An exploring system in the borehole carries two electrodes and the potential is measured between one of these electrodes and an electrode remotely located therefrom to provide a first measurement. The potential between the two exploring device electrodes is measured to provide a second measurement. A low-frequency function of the first measurement and a high-frequency function of the second measurement are utilized to provide a substantially error-free spontaneous potential measurement. The two electrodes carried through the borehole can comprise the armor of a cable which supports a well tool in the borehole and an electrode mounted on the well tool. Alternatively, these two electrodes can take the form of two closely spaced electrodes on the well tool so as to give a differential or gradient-type measurement. This gradient measurement could also be obtained by measuring the naturally occurring current flow in the borehole.

32 Claims, 9 Drawing Figures

PATENTED JAN 25 1972 3,638,105

METHODS AND APPARATUS FOR INVESTIGATING THE SPONTANEOUS POTENTIAL OF EARTH FORMATIONS

This invention relates to well-logging methods and apparatus and more specifically to methods and apparatus for obtaining indications of spontaneous potentials existing in earth formations traversed by a borehole.

The spontaneous potential, or self potential, hereinafter called SP, is the potential produced naturally by electrochemical phenomena in the formations. This electrochemical phenomena causes electromotive forces to be produced at the contacts between the drilling mud or its filtrate and the formation water in the pores of the permeable beds and across the adjacent shales. In the typical SP logging method, the potential is measured between a surface reference electrode and an electrode in the column of conductive mud as this latter electrode is pulled up past different formations. The character of the SP log produced by such measurements depends a great deal upon the mud and the formations encountered and is used to detect permeable beds and obtain values of formation water resistivity.

While systems for measuring the SP have proved generally satisfactory in the past, there are unfortunately a number of factors which can cause errors to be introduced into the usual SP measurement when utilizing the usual measuring systems. For example, magnetism noise is many times induced into the SP wire which is connected to the reference electrode at the surface of the earth by the magnetic field of a magnetized moving part of the reeling mechanism which pays out or takes in the cable at the surface of the earth.

Additionally, stray currents from a variety of different sources can affect the potential at the surface SP reference electrode. Since the potential difference between this surface reference electrode and the downhole SP electrode are measured, this noise potential on the surface SP electrode will show up in the SP log as noise. One such cause of surface electrode noise results from varying potentials in the earth due to current created by a voltaic cell produced by the interaction of the cable armor, mud, and the casing lining the borehole. The current from this voltaic cell is erratic because of intermittent contact between the cable armor and casing. Another cause of such surface electrode noise arises from the magnetic field set up by generators and motors at the well site. Another source of noise which affects the potential at the surface SP electrode is so-called telluric currents. Telluric currents are natural alternating electric currents flowing in essentially horizontal sheets near the surface of the earth. These telluric currents are induced in the earth by current circulating in the upper atmosphere which becomes highly conducting under the ionizing action of radiation from the sun.

These problems affecting the stability of the surface SP electrode become even more acute when offshore wells are logged. The primary reason for this is that it is difficult to isolate the SP surface reference electrode because of the conductive sea water. Also, the proximity of various metals in a good electrolyte (sea water) leads to all kinds of voltaic cells which vary with wave action.

In addition to noise affecting the surface SP electrodes, there are also a number of sources of noise which affect the downhole SP electrode. One such cause of this noise is the bimetallism noise caused by currents in the formation and mud column generated by a voltaic cell between dissimilar metals of the downhole logging apparatus. Additionally, noise produced by polarization of the downhole SP electrode causes the potential of this electrode to vary in an undesirable manner. However, the magnitude of this polarization noise is usually so low as to be unimportant. The polarization noise is primarily a DC or base line drift-type noise and the other previously mentioned noises are primarily AC or high-frequency-type noises.

To produce a noiseless SP log, it has been previously suggested to measure the differential SP or SP gradient, i.e., the difference in potential between two relatively closely spaced downhole electrodes, and integrate this difference in potential to arrive at the true SP value. However, any DC-type noise caused by polarization, or amplifier zero error, will be converted into a very large error in a relatively short time by the integrator in such a system.

It has also been suggested to reference the SP electrode to the armor of the cable which supports the well tool in the borehole at a point near the bottom of this armor. Since the conductors connecting the surface electronics to the SP electrode and cable armor run together through the cable and the cable armor is somewhat remote from the surface of the earth where a great amount of AC-type noise is generated, an SP measurement made in this manner will be relatively free of AC-type noise.

However, such an SP electrode to armor measuring scheme is not free of all error. Unfortunately, if any part of the armor, which has a finite resistivity, is adjacent a formation bed having a significant SP, the potential of the armor will be at a potential which depends to some extent on this SP, thus producing an error in the resulting SP measurement. For this reason, such a measuring scheme has not been used in the past to any significant extent.

It is therefore an object of the present invention to provide new and improved methods and apparatus for providing indications of the spontaneous potential of earth formations traversed by a borehole.

It is another object of the present invention to provide indications of the true spontaneous potential substantially free of error created by noise.

In accordance with the present invention, systems and methods for investigating the spontaneous potential of earth formations traversed by a borehole comprises at least two electrodes adapted for movement through a borehole and a third electrode located at or near the surface of the earth.

The invention further comprises obtaining measures of the naturally occurring potentials on each of these electrodes and using these measured potentials to produce an output signal which is representative of the spontaneous potential of an earth formation.

In one form, the two movable electrodes can comprise an electrode on a well tool in a borehole and the armor of the cable which supports the well tool. In another form, these two electrodes can comprise two closely spaced electrodes on the well tool to give a measure of the gradient which can then be integrated. The high-frequency components of either the potential difference measured between a well tool electrode and armor or the integrated gradient measurement can be used in conjunction with the low-frequency components of the potential difference between a well tool electrode and the surface located electrode to obtain the spontaneous potential measurement.

For a better understanding of the present invention, together with other and further objects thereof, reference is had to the following description taken in connection with the accompanying drawings, the scope of the invention being pointed out in the appended claims.

Referring to the drawings.

Figures 1, 2:
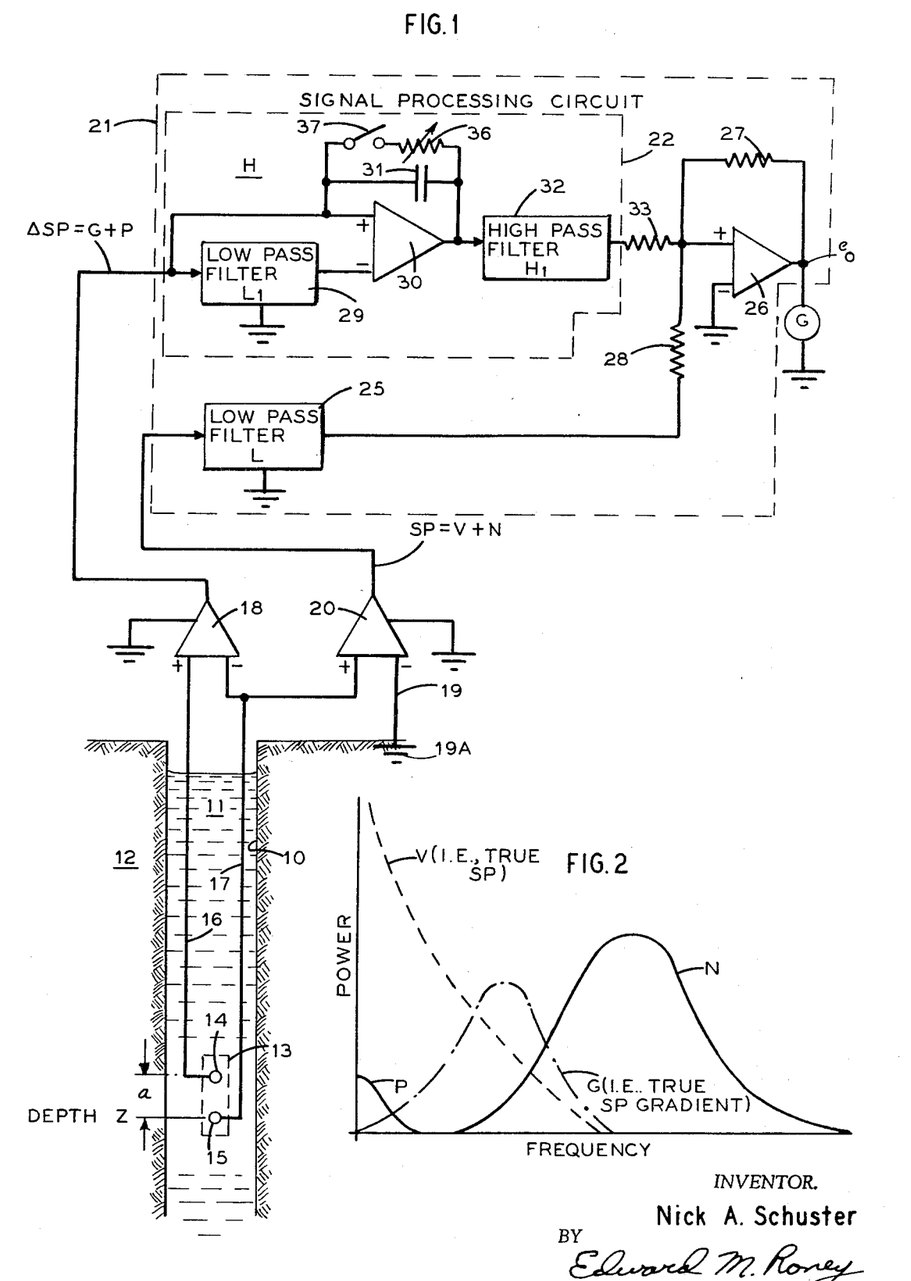
FIG. 1 is a schematic diagram of one embodiment of the present invention for obtaining indications of the spontaneous potentials of the earth formations traversed by a borehole.
FIG. 2 is a graph of power versus frequency for various components of the signals produced by the electrodes of FIG. 1.

Referring now to FIG. 1, there is shown a borehole 10 filled with a suitable conductive drilling mud 11 traversing earth formations 12. An electrode array 13 having electrodes 14 and 15 vertically spaced apart from one another by a distance "$a$" are supported in the borehole 10 on the end of a multiconductor cable (not shown) for logging the spontaneous potential of the formations 12. A pair of conductors 16 and 17 connect the downhole electrodes 14 and 15 to the surface of the earth where the potentials picked up by the electrodes 14 and 15 are processed to produce indications of the spontaneous potentials of the adjoining earth formations 12.

At the surface, the conductors 14 and 15 are applied to the input of a differential amplifier 18 which subtracts the potential of the lower electrode 15 from the potential of the upper electrode 14 to produce an output signal $\Delta SP$ proportional to the potential difference or gradient between electrodes 14 and 15. The conductor 17 and a conductor 19 connected to an electrode 19a embedded in the earth at the surface of the earth are connected to the inputs of a differential amplifier 20 to produce an output signal representative of the potential difference between the potentials on these two electrodes. This output signal from amplifier 20 corresponds to the usual spontaneous potential measured heretofore and is designated SP. These output signals from amplifiers 18 and 20 are then applied to a signal processing circuit 21 which processes these applied input signals in accordance with the present invention to produce an improved SP measurement. This improved SP measurement is applied to a galvanometer recorder 22.

Before discussing how the signal-processing circuit 21 operates to produce an improved SP output signal, it would first be in order to discuss some theoretical considerations. The usual SP measurement represented by the output signal from amplifier 20 is subject to several types of noise as discussed earlier. This noise can be broken down into two categories, high-frequency noise and low-frequency noise. The high-frequency noise, as discussed earlier, is caused by such things as telluric currents, bimetallism, drilling rig noise, etc., which generally have a period which is on the order of a few seconds or less. The DC or low-frequency noise generally results from electrode polarization and is not usually troublesome as concerns this usual SP measurement because of the low magnitude of this polarization noise relative to the measured SP. However, as discussed earlier, the high-frequency noise is usually troublesome as concerns the usual SP measurement (output of amplifier 20). Therefore, the output signal SP from amplifier 20 can be designated V+N where V is the true SP signal (i.e., is equal to the potential measured between electrodes 15 and 19a if noise were absent) and N is the high-frequency noise component.

The $\Delta SP$ signal from amplifier 18 is for the most part free of these AC or high-frequency noise components. The reason for this is that AC type noise sources are generally nonlocal or remote relative to the electrodes 14 or 15 and thus will affect the potential on the electrodes 14 and 15 similarly. Thus, since the differential amplifier 18 subtracts the potential on one electrode from the potential on the other electrode, this AC-type noise is usually canceled out.

The same is not true, however, for errors caused by polarization of the electrodes 14 and 15 since polarization is a local effect, i.e., it affects each electrode in an individual manner. As discussed earlier, the polarization noise is small relative to the total SP measurement such that it can for all practical purposes be ignored. However, since the $\Delta SP$ or gradient is the difference in potential between two closely spaced points in the borehole, this $\Delta SP$ or gradient signal will be relatively small in magnitude, thus rendering the polarization noise components important, especially after integration. Therefore, the output signal from amplifier 18 contains both a true, noiseless gradient signal, designated "G," and polarization noise, designated "P." This output signal $\Delta SP$ is thus equal to G+P.

It can thus be seen that the signal $\Delta SP$ from amplifier 18 contains valuable high-frequency information but poor low-frequency information because of the polarization error. The conventional SP measurement contains valuable low-frequency information but poor high-frequency information because of the high-frequency noise N. This is better illustrated in FIG. 2 where there is shown a plot of power versus frequency for the above-discussed signal components. It can be seen that the true noiseless SP, represented as the dashed line curve V, has a large amount of power at low frequencies and rapidly decreases to very little power at higher frequencies. The true, noiseless gradient signal G, represented as the dash dot line curve, has very little low-frequency power and a significant amount of intermediate or high-frequency power. The polarization noise P, on the other hand, has a significant amount of low-frequency power and rapidly diminishes to zero power as the frequency increases. The high-frequency noise component N has no power at low frequencies but a significant amount of power at high frequencies.

From FIG. 2, since the SP measurement signal is V+N and the measured gradient signal $\Delta SP$ is equal to G+P, it can be seen that the conventional SP measurement from amplifier 20 can be utilized for its low-frequency information and the SP difference measurement, i.e., $\Delta SP$, from amplifier 18 can be utilized for its high-frequency information. That is to say, the distribution of power versus frequency for these signals is such that the noise components N and P can be readily separated from the information components V and G for each of the derived signals SP and $\Delta SP$. In accordance with the present invention, both the SP and $\Delta SP$ measurements are combined in the signal processing circuit 21 which operates to detect the low-frequency component of the SP measurement and the high-frequency component of the $\Delta SP$ measurement and combine these two detected components to arrive at a compensated SP measurement.

The $\Delta SP$ gradient signal output from amplifier 18 is given by the expression:

$$\Delta SP = G + P = V(z+a) - V(z) + P \approx a(dV/dz) + P \quad (1)$$

where $V(z)$ is the true SP at the depth level $z$ in the borehole, and $V(z+a)$ is the true SP at the depth level $z+a$ in the borehole. Since analog type circuits operate in the time domain, it would first be desirable to examine Equation (1) written as a function of time. In this case, Equation (1) becomes:

$$\Delta SP = a \frac{dV}{dt} \cdot \frac{dt}{dz} + P = \frac{a}{u} \frac{dV}{dt} + P \quad (2)$$

where $u$ is the velocity ($dz/dt$) of the electrode array. In Laplace transform notation, Equation (2) can be expressed as:

$$L(\Delta SP) = S\tau \tilde{V}(z) + \tilde{P} \quad (3)$$

where $$\tau = a/u \quad (4)$$

The expression for the signal output from amplifier 20 is:

$$SP = V(z) - V_o + N \quad (5)$$

where $V_o$ is the voltage on the SP surface electrode 19a. Since $V_o$ would ordinarily be 0 volts except for the effect of the noise component N, Equation (5) can be rewritten as:

$$SP = V(z) + N \quad (6)$$

The Laplace transform for equation (6) is:

$$L(SP) = \tilde{V}(z) + \tilde{N} \quad (7)$$

$\tilde{V}(z)$ will hereafter be referred to simply as $\tilde{V}$.

From FIG. 2, since the desired $V$ term has maximum power at lower frequency and the undesired noise term $N$ has maximum power at high frequencies, it is clear that these two terms, $V$ and $N$, should be passed at low frequencies only. On the other hand, since the desired gradient term $G$ has maximum power at mid or high frequencies and the undesired noise term $P$ has maximum power at low frequencies, it is clear that these two terms, $G$ and $P$, should be passed at high frequencies only. Therefore, the expression for the output signal $e_o$ from the signal processing circuit 21 should desirably be:

$$\tilde{e}_o = L(\tilde{V} + \tilde{N}) + H(S\tau\tilde{V} + \tilde{P}) \quad (8)$$

or $$\tilde{e}_o = (L + S\tau H)\tilde{V} + L\tilde{N} + H\tilde{P} \quad (9)$$

where $L$ and $H$ are low and high-frequency transfer functions respectively.

Turning now to FIG. 1, the voltage signal from amplifier 20 is supplied to a low-pass filter having the transfer characteristic $L$ of Equation (9). The output of the low-pass filter 25 is applied by way of a summing resistor 28 to a summing amplifier 26 having a feedback resistor 27.

The $\Delta SP$ gradient signal from amplifier 18 is applied to a circuit 22 having the transfer function "$H$" of Equation (9) which operates to integrate and filter the applied input signal $\Delta SP$. Within the circuit 22, a low-pass filter 29 having a transfer characteristic $L_1$, operates to pass only the low-frequency portion of the $\Delta SP$ signal to the subtracting input of an operational amplifier 30. The $\Delta SP$ signal from amplifier 18 is applied directly to the positive input of the amplifier 30. A capacitor 31 is connected across the amplifier 30 such that the combination of the amplifier 30 and capacitor 31 operates as an integrator. The output of this integrator is supplied to a high-pass filter 32 having a transfer characteristic $H_1$ and the output signal therefrom is applied to the summing amplifier 26 by way of a summing resistor 33. The output signal from summing amplifier 26, designated $e_o$, is then recorded by a suitable galvanometric recorder 34.

By comparison of Equations (8) and (9) with the signal processing circuit 21, it is clear that the circuit 21 can be expressed by equations (8) and (9). The considerations for determining the transfer characteristics $L$ and $H$ will be understood from the following.

From Equation (9), the condition for faithfully reproducing the true $SP$ term $V$ is:

$$L + S\tau H = 1 \quad (10)$$

Rewriting Equation (10) in terms of the high-pass filter function $H$:

$$H = (1 - L/S\tau) \quad (11)$$

In FIG. 1, the transfer function $H$ for the circuit 22 portion of the signal processing circuit 21 is:

$$H = ((1 - L_1)H_1)/S\tau \quad (12)$$

It can be seen from Equation (12) that if $L_1$ is equal to $L$ and $H_1$ is equal to 1, then Equation (12) will be identical with Equation (11) and the processing circuit 22 of function $H$ will satisfy equations (10) and (11). Since $H_1$ is equal to 1, the high-pass filter 32 would not be necessary. However, in practice, a circuit such as high-pass circuit 22 would suffer from drift due to imperfections in the integrator and slight inaccuracies in the input circuit, i.e., amplifier 18 and low-pass filter 29. Since the low-frequency channel provides reliable DC information, there would be no loss of information if the high-pass filter 32 were included in the high-frequency processing circuit 22 and then any DC instability of the high-frequency circuit 22 would thus be compensated. Particularly, it would be possible for the integrator comprising amplifier 30 and capacitor 31 to be imperfect since the integrators 30–31 would not need to faithfully reproduce DC signal components because of the action of the high-pass filter 32. Thus, a variable resistor 36 could be shunted across the capacitor 31 upon closing a switch 37 to bring about the desired time constant for the integrator. It should be noted that although Equation (10) specifies that $L + S\tau H$ should equal "1" for faithfully reproducing the true $SP$ term $V$, it may be desirable to allow $L + S\tau H \neq 1$ and such is contemplated by the present invention.

In the above description of FIG. 1, the signal processing circuit 21 was operating in the time domain. This is possible if the downhole investigating device is moved at a constant velocity. If the velocity is not constant, some high-frequency frequency error will be introduced into the output measurement. To compensate for this in the signal processing circuit 21, the integrator 30–31 could be made to integrate as a function of depth rather than time. Moreover, the filters 25, 29 and 32 could also be modified in accordance with the rate of movement of the downhole-investigating device 13.

Figure 3:
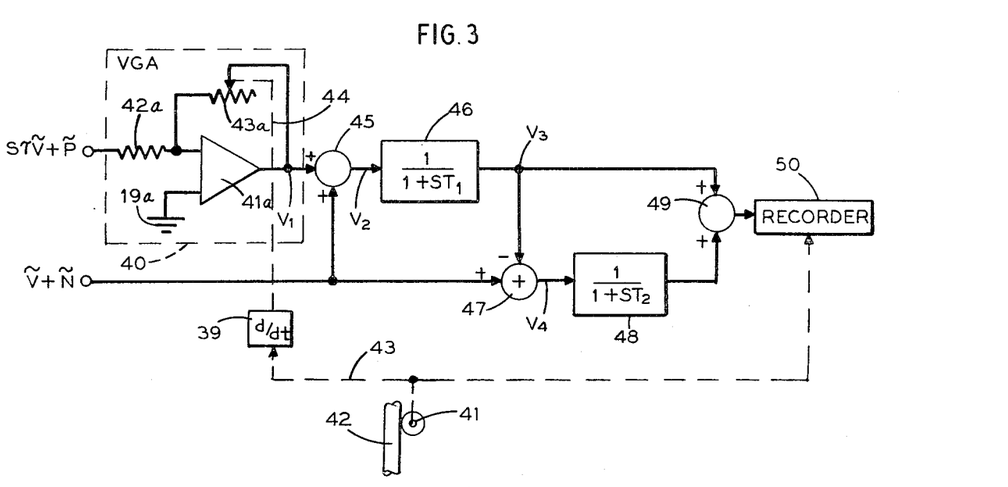
FIG. 3 is a schematic representation of another embodiment of the present invention.

Turning now to FIG. 3, there is shown another embodiment of the signal processing circuit 21 of FIG. 1. This FIG. 3 circuit performs generally the same functions as the FIG. 1 circuit but additionally corrects for velocity changes in the downhole investigating device. In FIG. 3, the $\Delta SP$ signal is applied to the input of a variable gain amplifier 40 of gain K, where K is variable as a function of the velocity of the cable at the surface of the earth. To effect this control, a rotating wheel 41 engages the cable 42 so as to rotate as a function of the movement of the cable 42. A rotating shaft 43 is driven by the wheel 41 and is applied to the variable gain amplifier 40 to vary the gain thereof as a function of cable velocity.

In the variable gain amplifier 40, the $\Delta SP$ input signal is applied via an input resistor 42a to one input of an operational amplifier 41a, the other input thereto being connected to the surface $SP$ electrode 19a. The feedback resistor for operational amplifier 41a is a potentiometer 43a whose wiper arm is driven by a shaft 44 from a ratemeter 39 which, in response to the rate of rotation of shaft 43, causes the shaft 44 to rotate as a function of the rate of rotation of shaft 43. Since the gain of amplifier 40 is the ratio of the feedback resistance to the input resistance and the value of the feedback resistor 43a is varied as a function of cable velocity, it can be seen that the gain of amplifier 40 will vary as a function of cable velocity.

The output signal from variable gain amplifier 40 is applied to a summing junction 45 to which is also applied the regular $SP$ signal from the amplifier 20 of FIG. 1. The output signal from summing junction 45 is applied to a first low-pass filter 46 having a Laplace transfer function $1/1+ST_1$ where $T_1$ is the circuit 46 time constant. The inverse of the output signal from filter 46, and the $SP$ input signal are summed by a summing junction 47 for application to a second low-pass filter 48 having a Laplace transfer function $1/1+ST_2$ where $T_2$ is the circuit 48 time constant. The output signals from both low-pass filters 46 and 48 are summed by a summing junction 49 for application to a recorder 50 whose recording medium is driven by the shaft 43 as a function of cable movement. Therefore, the compensated $SP$ output signal from signal processing circuit 38 is recorded by the recorder 50 as a function of borehole depth.

Since the transfer functions $L$ and $H$ are applied to the $SP$ and $\Delta SP$ signals respectively in the circuit of FIG. 3, the expressions for $L$ and $H$ from FIG. 3 are:

$$L = \frac{1}{1+ST_1}\left(1 - \frac{1}{1+ST_2}\right) + \frac{1}{1+ST_2} \quad (13)$$

or $$L = \frac{1+S(T_1+T_2)}{(1+ST_1)(1+ST_2)} \quad (14)$$

and $$H = \frac{K}{1+ST_1} - \frac{K}{1+ST_1}\frac{1}{1+ST_2} \quad (15)$$

$$H = \frac{KST_2}{(1+ST_1)(1+ST_2)} \quad (16)$$

Equation (14) will be recognized as the Laplace expression for a low-pass filter and Equation (16) will be recognized as the Laplace expression for a band-pass filter.

From Equations (14) and (16), the expression $L+S\tau H$ from Equation (9) can be written as:

$$L + S\tau H = \frac{1 + S(T_1+T_2) + S^2 K\tau T_2}{(1+ST_1)(1+ST_2)} \quad (17)$$

Figure 4:
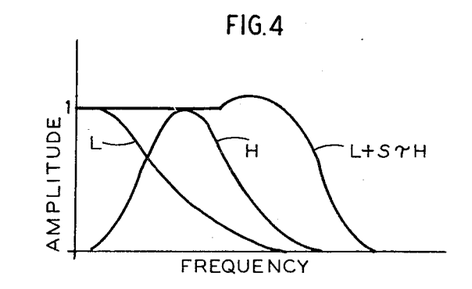
FIG. 4 is an amplitude versus frequency plot for certain circuits of FIG. 3.

Turning now to FIG. 4, there is shown a plot of amplitude versus frequency for the transfer functions $L$, $H$ and $L+S\tau H$ from Equations (14), (16), and (17) respectively. From FIG. 4, it can be seen that the low-frequency transfer function $L$ describes a low-pass filter, the transfer function $H$ describes a band-pass filter, and the function $L+S\tau H$ describes a low-pass filter with a cutoff frequency higher than that for both the low frequency and high-frequency transfer functions $L$ and $H$.

Comparing Equation (9) with the plots of FIGS. 2 and 4, it can be seen that by properly selecting the circuit constants for the circuit of FIG. 3, this FIG. 3 circuit will effectively cancel out substantially all of the high-frequency noise component $N$ since the transfer function $L$ from FIG. 4 can be chosen to reduce substantially to zero before the noise component becomes important. It can also be seen that the polarization component $P$ will be substantially eliminated since this component $P$ reduces substantially to zero at a frequency lower than the frequency range where transfer function $H$ becomes important. It can also be seen that the true $SP$ component $V$ will be passed throughout the frequency band where $V$ is important since the transfer function $L+S\tau H$ can be chosen to remain at 1 until a frequency slightly beyond the point where the true $SP$ component $V$ is no longer important. It should be pointed out here that while Equation (10) specifies that $L+S\tau H=1$ to faithfully reproduce the true $SP$ term $V$, it is only necessary that this condition be satisfied over the frequency range where $V$ is important. Thus, the FIG. 3 circuit substantially satisfies Equation (10) over the frequency range of interest.

It can be seen that Equation (17) contains a term $\tau\tau$ was earlier defined as being equal to $a/u$ where $a$ is the spacing between electrodes 14 and 15 and $u$ is the velocity of the tool 13 moving through the borehole. If the tool 13 always moved through the borehole at a constant velocity, the circuit of FIG. 3 would always produce accurate results. However, such is not always the case and thus the circuit of FIG. 3 is constructed to compensate for different tool velocities. This compensation is accomplished in FIG. 3 by varying the feedback resistor 43 as a function of tool velocity such that the $K\tau$ term of Equation (17) will always be constant. It has been found that desirable results will be obtained if this term $K\tau$ is set equal to the time constant $T_1$. Thus, setting $K\tau$ equal to $T_1$ in Equation (17):

$$L+S_\tau H = \frac{1+S(T_1+T_2)+S^2T_1T_2}{(1+ST_1)(1+ST_2)} \qquad (18)$$

It can be seen that the numerator portion of Equation (18) is equal to the denominator portion thereof such that $L+S_\tau H$ is equal to 1 (over the frequency range of interest) in accordance with equation (10). Thus, the true $SP$ component $V$ will be the signal supplied from the signal-processing circuit 38 of FIG. 3 to the recorder 50.

In selecting the electrode spacing "$a$" and circuit time constants $I_1$ and $I_2$ (and thus the crossover frequency), there are a number of factors that should be taken into account. For example, the electrode spacing $a$ should be simultaneously small for a good measure of the gradient and large to obtain large signal values. A desirable compromise has been found to be a 1 to 2-foot spacing. For the selection of $T_1$, $T_2$, ($T_1=T_2$), this time constant should be high enough to enable the transfer function $L$ to drop to substantially zero before $N$ rises to any appreciable value. At the same time, it should be low enough that the transfer function $H$ will be substantially zero at frequencies where the polarization term $P$ is significant. Of course, the speed at which the electrodes are moved through the borehole is a factor in determining the time constant $T_1$, $T_2$. For typical logging speeds in the range of 3,600 feet per hour, time constants in the range of 5 to 40 seconds have been found to give good results.

Figure 5:
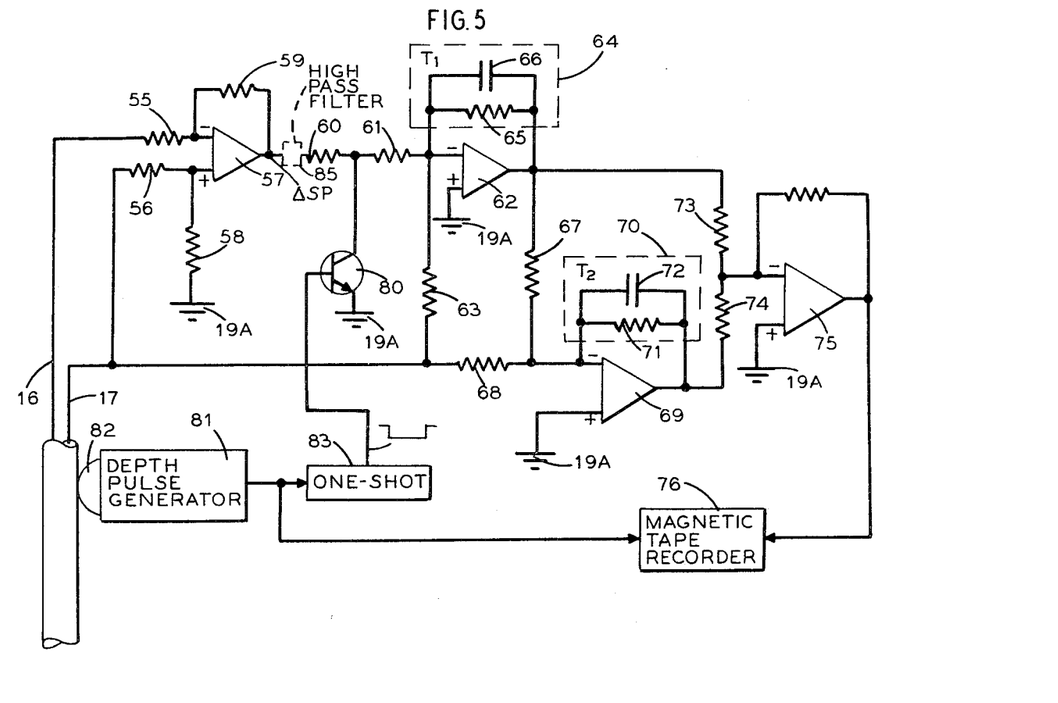
FIG. 5 is a circuit diagram showing the apparatus of FIG. 3 in greater detail.

Now turning to FIG. 5, there is shown the signal processing circuit 38 of FIG. 3 in greater detail along with another embodiment of a device for varying the gain $K$ as a function of tool velocity. In FIG. 5, the conductors 16 and 17 from the electrodes 14 and 15 respectively of FIG. 1 are connected through input resistors 55 and 56 respectively to the positive and negative inputs respectively of an operational amplifier 57 such that the output signal therefrom will be proportional to $\Delta SP$. The positive input terminal of amplifier 57 is connected via a resistor 58 to surface reference electrode 19a of FIG. 1 and a feedback resistor 59 is connected from the output of amplifier 57 to the negative input thereof. The output signal from amplifier 57 is supplied through a pair of resistors 60 and 61 having a total resistance $r$ to the positive input of an operational amplifier 62.

The lower $SP$ electrode 15 potential on conductor 17 is supplied via an input resistor 63 to the negative input of operational amplifier 62. A feedback circuit 64 including a resistor 65 and capacitor 66 is connected from the output of amplifier 62 to the negative input terminal thereof. The capacitor 66 and resistor 65 have a time constant $T_1$. The output signal from amplifier 62 and the $SP$ potential on conductor 17 are summed at the negative input terminal of operational amplifier 69 by way of a pair of input resistors 67 and 68 respectively. The positive input terminals of amplifiers 62 and 69 are connected to the surface reference electrode 19a such that the $SP$ potential on conductor 17 will effectively be referenced to the reference potential of surface electrode 19a. The amplifier 69 has a feedback circuit comprising a resistor 71 and capacitor 72 which have a time constant $T_2$.

The output signals from amplifiers 62 and 69 are summed via a pair of resistors 73 and 74 at the negative input terminal of an operational amplifier 75. The output signal from this operational amplifier 75 comprises the compensated $SP$ output signal which is applied to a recorder, in this case a magnetic tape recorder 76, for recording as a function of borehole depth.

To enable RC filters in the FIG. 5 circuit to operate in the time domain on input signals in the depth domain, a switching transistor 80 connects the junction point between the resistors 60 and 61 to ground at periodic time intervals determined by the velocity of the cable. To sense this cable velocity, a suitable depth pulse generator 81, which includes a rotating wheel 82 in engagement with the cable, generates a pulse for each given incremental movement of the cable. These pulses are utilized to energize a fixed time period one-shot 83 which operates to turn the transistor 80 on and off with a repetition rate proportional to cable and tool velocity.

Figure 6A:
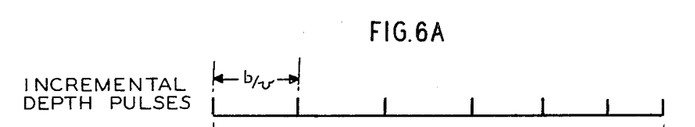
FIGS. 6A and 6B show waveform diagrams useful for explaining the operation of a portion of the apparatus of FIG. 5.
Figure 6B:
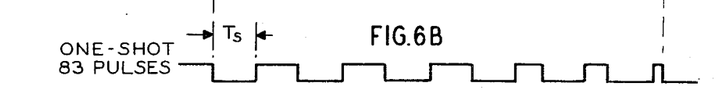

Turning now to FIGS. 6A and 6B, there are shown the waveform diagrams of the incremental depth pulses from generator 81 and the timing pulses generated by one-shot 83. As seen in FIG. 6A, the incremental depth pulses can vary in frequency depending on the velocity of the cable. However, the timing pulses from one-shot 83, which are generated in response to each incremental depth pulse have a fixed time duration $T_s$. These timing pulses turn off the transistor 80 to thus remove ground potential from the junction point between resistors 60 and 61. By so doing, the average value of current supplied from amplifier 57 to amplifier 62 will vary in proportion to the velocity of the cable.

If the depth pulse generator 81 produces a pulse for each $b$ inches of cable movement, then the time interval between successive incremental depth pulses will be $b/u$, where $u$ is the cable velocity. Since the total resistance value of resistors 60 and 61 is $r$, the expression for the average current supplied to the amplifier 62 will be:

$$I_{avg} = \frac{\Delta SP}{r} \cdot \frac{T_s}{\frac{b}{u}} \qquad (19)$$

or $$I_{avg} = \frac{\Delta SP u T_s}{br} \qquad (20)$$

If the resistance value of resistor 65 is R, then the DC gain of amplifier 62, which gain is by definition equal to $K$, is:

$$\text{DC gain of amp. } 62 = K = \frac{R}{\frac{br}{uT_s}} = \frac{RuT_s}{br} \qquad (21)$$

Since, in Equation (21), $R$, $T_s$, $b$ and $r$ are constants, it can be seen that the gain $K$ will vary as a function of $u$ only.

There is one other problem that should be considered here. From Equation (9), the polarization term $P$ is multiplied by the transfer function $H$ which, for the FIG. 5 circuit, is given by Equation (16). Substituting $T_1u/a$ for $K$ (since $K\tau=T_1$ and $\tau=a/u$ $$P\left[\frac{\frac{u}{a}ST_1T_2}{(1+ST_1)(1+ST_2)}\right] \quad (22)$$

From Equation (22) a term $Pu$ appears. Thus, if $u$ changes (i.e., there is some acceleration) and $P$ has any DC level other than zero, a so-called "acceleration step" will result and a transient will appear in $e_o$ because of the action of the high-pass transfer function $ST_1T_2/(1+ST_1)(1+ST_2)$. Of course, such a transient in $e_o$ is undesirable.

To solve this problem a high-pass filter is inserted in the $S_TV+P$ input channel of the signal processing circuit of FIG. 5 (or FIG. 3) to cause the DC level of the polarization term $P$ to go to zero. This filter is represented by the dashed line high-pass filter 85 in FIG. 5. This filter 85 would, of course, not be necessary if the velocity of the tool 13 were always maintained constant.

If the transfer function for high-pass filter 85 is $ST_3/1+ST_3$, then $K$ becomes a new factor, designated $K'$, as follows:

$$K' = \frac{ST_3}{1+ST_3}\left(\frac{u}{a}T_1\right) \quad (23)$$

Upon inserting the high-pass filter 85 into the FIG. 5 circuit, it would seem necessary to reevaluate the original choices for the transfer functions $L$ and $H$. However, if $T_3 \gg T_1$, $T_2$, the original choices for $L$ and $H$ can be retained leaving only a negligible departure from unity gain relationship for $L+S_TH$ given by Equation (10).

It should also be mentioned at this point that an $SP$ current measurement could be utilized to obtain the gradient signal instead of using the two closely spaced electrodes. In this case, the $SP$ current measurement would yield:

$$I_{SP} = \frac{dV}{dz}\sigma_m A \quad (24)$$

where $\sigma_m$ is the conductivity of the borehole fluid and $A$ is the area of borehole fluid passing through the current measuring toroid. Since $\sigma_m A$ can be considered as a constant, the measurement is proportional to $dV/dz$, the same as when using the two electrode configuration.

Figure 7:
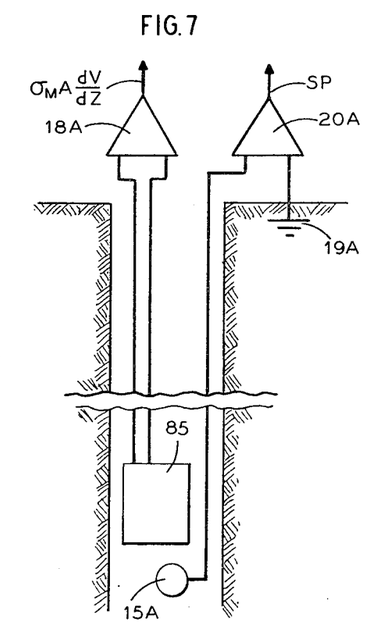
FIG. 7 illustrates another embodiment of the present invention.

As shown in FIG. 7, the regular $SP$ measurement would be made in the usual way with electrodes 15a and 19a and amplifier 20a. However, as an example, the gradient measurement is made in FIG. 7 by use of a flux gate device 80 feeding an amplifier 18a. The device 80 could be of the type shown in U.S. Pat. No. 2,992,389 granted to M. Gondouin on July 11, 1961. The output signals from amplifiers 18a and 20a are then processed in the manner discussed earlier to obtain a compensated $SP$ measurement.

Instead of using the gradient $SP$ signal to supply high-frequency $SP$ information, it would also be possible to use the potential measured between the regular $SP$ electrode 15 and the armor of the cable to give this high-frequency information while using the usual $SP$ measurement (potential measured between electrodes 15 and 19A) for low-frequency information.

Figures 8, 9:
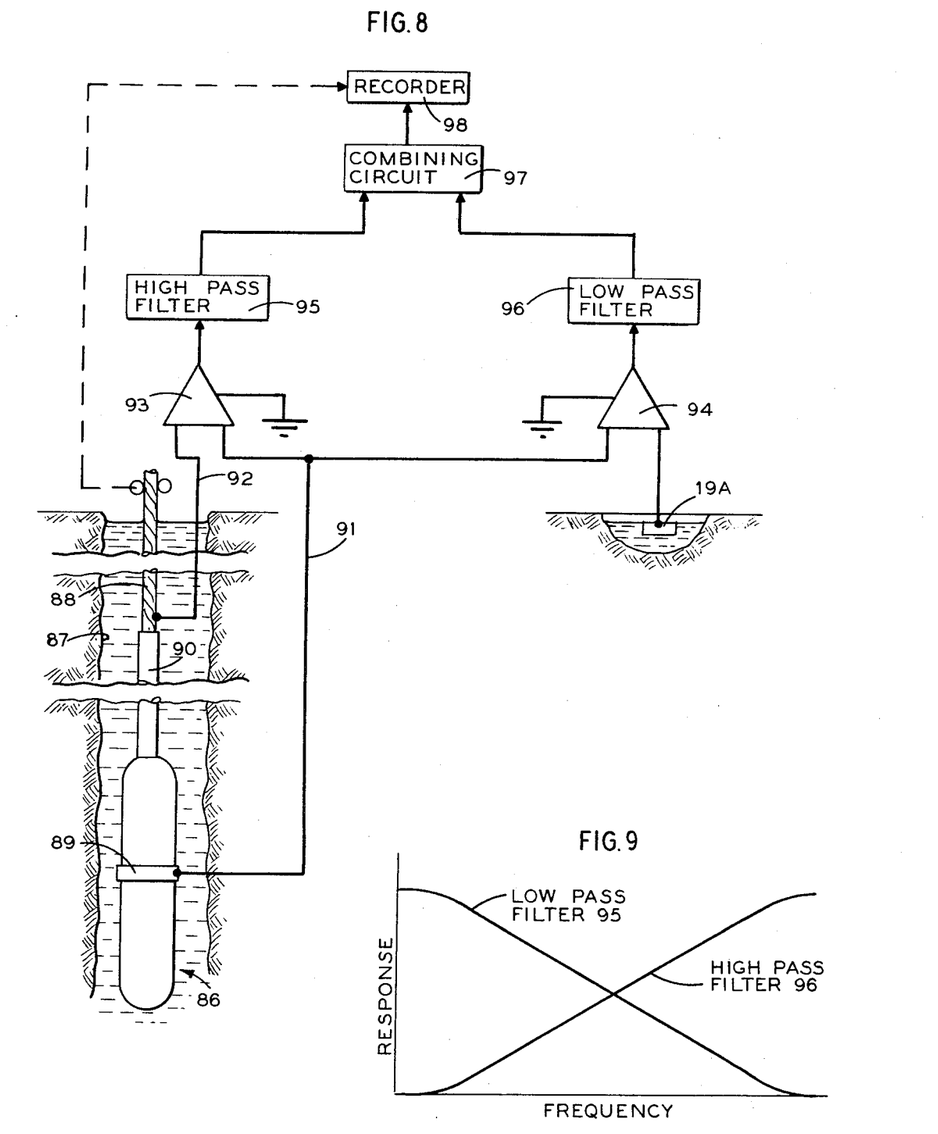
FIG. 8 shows still another embodiment of the present invention.
FIG. 9 illustrates the frequency response of certain circuits in FIG. 8.

To this end, referring to FIG. 8, there is shown an exploring device 86 having an $SP$ electrode 89 supported in a borehole 87 by an armored cable 88. The lower portion of this cable is desirably covered with a suitable insulation material 89. A pair of conductors 91 and 92 connect the $SP$ electrode 89 and the armor respectively to apparatus located at the surface of the earth. (These two conductors actually form part of the cable 88 but are shown apart therefrom for purposes of clarity of the electrical diagram.)

At the surface of the earth, the difference in potential between the potentials measured by the $SP$ electrode 89 and the armor of the cable 88 is obtained by an amplifier 93. The difference between the potential on the $SP$ electrode 89 and the potential on the surface electrode 19A is obtained by an amplifier 94. The high-frequency component of the $SP$ potential referenced to the cable armor is selected by a high-pass filter 95 and the low-frequency component of the $SP$ potential referenced to the surface electrode 19A is selected by a low-pass filter 96. These low- and high-frequency components are combined by a combining circuit 97 and applied to a recorder 98 for recording as a function of borehole depth. For a more detailed explanation of circuits which can process the signals of FIG. 8, refer to copending application Ser. No. 881,794 filed by Milton E. Cram on Dec. 3, 1969.

As stated earlier, the $SP$ measurement produced by the amplifier 94 (the customary $SP$ measurement) has good low-frequency information but suffers from too much AC-type noise. The $SP$ measurement produced by the amplifier 93 has good high-frequency information but poor low-frequency information. By extracting the low-frequency component of the former measurement and the high-frequency information of the latter measurement, a true $SP$ measurement can be obtained. This is what the FIG. 8 apparatus does. The frequency response curves for the filters 95 and 96 are shown in FIG. 9. The summation of these two curves should be unity for frequencies of interest to faithfully reproduce the true $SP$.

While all of the processing circuitry has been shown located at the surface of the earth, it is to be understood that it could just as well be contained in the downhole tool or partly downhole and partly at the surface.

It can thus be seen from the foregoing that new methods and apparatus have been set forth for producing a compensated $SP$ measurement which is more accurately representative of the true $SP$ of subsurface formations than has heretofore been available. This has been accomplished by combining the conventional $SP$ measurement with another form of $SP$ measurement and utilizing these measurements in accordance with the teachings of the present invention to arrive at a measurement which is substantially free of noise.

Instead of combining these two measurements as set forth earlier, it would also be possible to record the measurements and visually examine them to obtain some information relating to the true $SP$. Alternatively, these two measurements could be processed by a properly programmed general purpose digital computer to produce a compensated $SP$ measurement. By utilizing well-known digital filtering techniques, superior filtering of the above discussed measurements could be accomplished.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating the spontaneous potential of earth formations traversed by a borehole, comprising
   at least two electrodes adapted for movement through a borehole;
   a third electrode located at or near the surface of the earth;
   means for measuring the difference between the potentials on said two electrodes in a borehole to produce a first measurement;
   means for measuring the difference between the potential on one of said two borehole electrodes and said third electrode to produce a second measurement; and
   combining means for combining said first and second measurements to produce a compensated measurement which is representative of the spontaneous potential of an earth formation.

2. The apparatus of claim 1 wherein said combining means includes means for substantially filtering out at least the low-frequency components of said first measurement to produce a filtered first measurement, means for substantially filtering out the high-frequency components of said second measurement to produce a filtered second measurement, and means for combining said first and second filtered measurements to produce said compensated measurement.

3. The apparatus of claim 1 wherein said electrodes adapted for movement through a borehole comprise two relatively closely spaced electrodes each having a relatively short length in a direction parallel to the borehole.

4. The apparatus of claim 1 wherein said electrodes adapted for movement through a borehole comprise a first electrode of relatively small length along the axis of the borehole and a second electrode of relatively great length along the borehole axis.

5. The apparatus of claim 4 wherein said second electrode is that portion of the armor of a cable which is exposed to the fluid in a borehole, said cable supporting the first electrode in a borehole.

6. The apparatus of claim 5 wherein an insulation material covers the lower portion of said armor so that said first and second electrodes will be separated by a relatively great length.

7. The apparatus of claim 1 wherein said two movable electrodes are positioned relatively close together and said combining means includes means for substantially integrating said first measurement to produce an integrated first measurement, means for substantially filtering out the high-frequency components of said second measurement to produce a filtered second measurement, and means for combining said integrated first measurement and said filtered second measurement to produce said compensated measurement.

8. The apparatus of claim 1 wherein said two movable electrodes are positioned relatively close together and said combining means includes means for substantially integrating said first measurement to produce an integrated first measurement, means for substantially filtering out the low-frequency components of said integrated first measurement to produce a filtered integrated first measurement, means for substantially filtering out the high-frequency components of said second measurement to produce a filtered second measurement, and means for combining said filtered integrated first measurement and said filtered second measurement to produce said compensated measurement.

9. The apparatus of claim 1 wherein said combining means includes first means for substantially filtering out the low-frequency components of said first measurement to produce a filtered first measurement, second means for measuring the rate of movement of said at least two electrodes through a borehole, means responsive to said rate of movement measurement for adjusting a parameter of said first means as a function of said rate of movement, means for substantially filtering out the high-frequency components of said second measurement to produce a filtered second measurement, and means for combining said first and second filtered measurements to produce said compensated measurement.

10. Apparatus for investigating earth formations traversed by a borehole, comprising:
  a. means adapted to carry at least two electrodes through a borehole;
  b. a cable supporting said carrying means for movement through a borehole;
  c. means for measuring the difference between the potentials on said two electrodes to produce a first measurement, said first measurement being a function of the velocity of said electrodes through a borehole;
  d. means for measuring the difference between the potential on one of said two electrodes and the potential at a relatively remote point to produce a second measurement; and
  e. means for combining said first and second measurements to produce a compensated measurement which is representative of a formation characteristic, said combining means including means responsive to the movement of said cable for converting said first measurement from a function of distance to a function of time so that said combining means can operate as a function of time.

11. Apparatus for investigating the spontaneous potential of earth formations traversed by a borehole, comprising:
  a. a support means adapted to carry at least two electrodes through a borehole;
  b. means for measuring the difference between the potentials on said two electrodes to produce a first measurement, said first measurement including at least an SP gradient signal $G$ and an electrode polarization noise component $P$;
  c. means for measuring the difference between the potential on one of said two electrodes and the potential at a relatively remote point to produce a second measurement, said second measurement including at least an SP component $V$ and a high-frequency noise component $N$; and
  d. means for combining said first and second measurements to produce a compensated measurement $SP_c$ in accordance with the relationship:
$$SP_c = L(V+N) + H(G+P)$$
where $L$ and $H$ are low- and high-frequency operators respectively.

12. The apparatus of claim 11 wherein the low-frequency operator $L$ in Laplace transform notation is:
$$L = \frac{1+S(T_1+T_2)}{(1+ST_1)(1+ST_2)}$$
and the high-frequency operator $H$ in Laplace transform notation is:
$$H = \frac{KST_2}{(1+ST_1)(1+ST_2)}$$
where $S$ is the Laplace operator, $T_1$ and $T_2$ are selected time constants, and $K$ is proportional to $u/a$ where $u$ is the velocity of said electrodes and $a$ is the spacing between said electrodes.

13. Apparatus for investigating the spontaneous potential of earth formations traversed by a borehole, comprising:
  a. means for deriving a measure of the potential gradient in the borehole to produce a first measurement;
  b. means for deriving a measure of the difference between the potential at two locations in a borehole which are separated by a relatively great distance to produce a second measurement; and
  c. combining means for combining said first and second measurement to produce a compensated measure of the spontaneous potential.

14. The apparatus of claim 13 wherein said means for deriving a measure of the gradient includes means for measuring the potential difference between two relatively closely spaced electrodes.

15. The apparatus of claim 13 wherein said means for deriving a measure of the gradient includes means for measuring the current flow in a borehole.

16. The apparatus of claim 15 wherein said combining means includes means for substantially filtering out high-frequency components of said second measurement to produce a filtered second measurement, means for substantially integrating said first measurement, means for substantially filtering out the low-frequency components of said first integrated measurement to produce a filtered integrated first measurement, and means for combining said second filtered measurement with said first filtered integrated measurement to produce said compensated measurement.

17. A method of investigating the spontaneous potential of earth formations traversed by a borehole, comprising:
  moving at least two electrodes through a borehole;
  measuring the difference between the potentials on said two electrodes in a borehole to produce a first measurement;
  measuring the difference between the potential on one of said two borehole electrodes and a third electrode to produce a second measurement; and
  combining said first and second measurements to produce a compensated measurement which is representative of the spontaneous potential of an earth formation.

18. The method of claim 17 wherein said step of combining includes the steps of substantially filtering out at least the low-frequency components of said first measurement to produce a filtered first measurement, substantially filtering out the high-frequency components of said second measurement to produce a filtered second measurement, and combining said first and second filtered measurements to produce said compensated measurement.

19. The method of claim 17 wherein said two electrodes in a borehole are relatively close together and said step of combining includes substantially integrating said first measurement to produce an integrated first measurement, substantially filtering out the high-frequency components of said second measurement to produce a filtered second measurement, and combining said integrated first measurement and said filtered second measurement to produce said compensated measurement.

20. The method of claim 17 wherein said two electrodes in a borehole are relatively close together and said step of combining includes substantially integrating said first measurement to produce an integrated first measurement, substantially filtering out the low-frequency components of said integrated first measurement to produce a filtered integrated first measurement, substantially filtering out the high-frequency components of said second measurement to produce a filtered second measurement, and combining said filtered integrated first measurement and said filtered second measurement to produce said compensated measurement.

21. The method of claim 17 wherein said combining step includes the steps of measuring the rate of movement of said at least two electrodes through a borehole, adjusting a parameter of said first measurement as a function of said rate of movement measurement, substantially filtering out the low-frequency components of said first measurement to produce a filtered first measurement, substantially filtering out the high-frequency components of said second measurement to produce a filtered second measurement, and combining said first and second filtered measurements to produce said compensated measurement.

22. A method of investigating the spontaneous potential of earth formations traversed by a borehole, comprising:
 a. measuring the difference between the potentials at two points in a borehole to produce a first measurement;
 b. measuring the difference between the potential at a point in the vicinity of said two electrodes and the potential at a relatively remote point to produce a second measurement; and
 c. combining said first and second measurements to produce a compensated measurement which is representative of the spontaneous potential of a formation.

23. A method of investigating the spontaneous potential of earth formations traversed by a borehole, comprising:
 a. moving two electrodes through a borehole;
 b. measuring the difference between the potentials on said two electrodes to produce a first measurement, said first measurement tending to include at least an SP gradient signal $G$ and an electrode polarization noise component $P$;
 c. measuring the difference between the potential on one of said two electrodes and the potential at a relatively remote point to produce a second measurement, said second measurement tending to include at least a true spontaneous potential and a component $V$ and a high-frequency noise component $N$; and
 d. combining said first and second measurements to produce a compensated measurement $SP_c$ in accordance with the relationship:

$$SP_c = L(V+N) + H(G+P)$$

where $L$ and $H$ are low- and high-frequency operators respectively.

24. The method of claim 23 wherein the low-frequency operator $L$ in Laplace transform notation is:

$$L = \frac{1 + S(T_1 + T_2)}{(1+ST_1)(1+ST_2)}$$

and the high-frequency operator $H$ in Laplace transform notation is $$H = \frac{KST_2}{(1+ST_1)(1+ST_2)}$$

where $S$ is the Laplace operator, $T_1$ and $T_2$ are selected time constants, and $K$ is proportional to $u/a$ where $u$ is the velocity of said electrodes and $a$ is the spacing between said electrodes.

25. A method of investigating the spontaneous potential of earth formations traversed by a borehole, comprising:
 a. deriving a measure of the difference between the potential at two locations in a borehole which are separated by a relatively great distance to produce a first measurement;
 b. deriving a measure of the potential gradient in the borehole to produce a second measurement;
 c. combining said first and second measurements to produce a compensated measure of the spontaneous potential of a formation.

26. The method of claim 25 wherein the step of deriving a measure of the potential gradient includes the step of measuring the potential difference between two relatively closely spaced electrodes.

27. The method of claim 25 wherein the step of deriving a measure of the gradient includes the step of measuring the current flow in a borehole.

28. Apparatus for investigating earth formations traversed by a borehole, comprising:
 a potential measuring electrode adapted for movement through a borehole;
 electrical parameter measuring means adapted for movement through a borehole with said electrode;
 electrical circuit means coupled with said at least one electrode and parameter measuring means to derive a first signal representative of a function of the spontaneous potential at said electrode and a second signal representative of a function of the spontaneous potential at said parameter measuring means; and
 signal-processing means responsive to said first and second signals for producing an output signal functionally related to components of said first and second signals from within dissimilar frequency bands.

29. The apparatus of claim 28 wherein said electrical parameter measuring means comprises another electrode.

30. The apparatus of claim 28 wherein said electrical parameter measuring means comprises means for measuring the current flow in a borehole.

31. A method of investigating earth formations traversed by a borehole, comprising:
 moving a potential-measuring electrode through a borehole to derive a first measurement representative of a function of the spontaneous potential at said electrode;
 moving with said electrode an electrical parameter measuring means to derive a second measurement representative of a function of the spontaneous potential at said parameter measuring means; and
 combining said first and second measurements to produce an output measurement functionally related to components of said first and second measurements from within dissimilar frequency bands.

32. The method of claim 31 wherein said first and second measurements are combined in accordance with the relationship $$V_o = L(SP) + H(G)$$

where $SP$, $G$ and $V_o$ are said first, second and third measurements respectively and $L$ and $H$ are low- and high-frequency operators respectively.

* * * * *